INVENTOR.
GUS PETER TRICOLES
EUGENE LOWELL ROPE

United States Patent Office 3,388,396
Patented June 11, 1968

3,388,396
MICROWAVE HOLOGRAMS
Eugene L. Rope, El Cajon, and Gus P. Tricoles, San Diego, Calif., assignors to General Dynamics Corporation, a corporation of Delaware
Filed Oct. 17, 1966, Ser. No. 587,033
12 Claims. (Cl. 343—17)

ABSTRACT OF THE DISCLOSURE

A microwave hologram and method of forming same is described. The hologram includes a plurality of scatterers disposed at discrete locations upon a microwave transparent supporting member. Each of the scatterers are so sized and located upon the supporting member that when it is illuminated by a microwave beam an interference pattern develops which corresponds to that when the object alone is illuminated by the beam.

---

The present invention relates to holograms and to apparatus and methods for the production and use of holograms which are formed with the aid of radiant energy having microwave frequencies.

Current holograms are formed by a photographic plate which has been exposed to the interference pattern of a signal beam scattered by an object and a reference beam, both beams being at optical frequencies; however, in the microwave portion of the electromagnetic spectrum it has not been possible to produce successful photographic holograms.

A microwave hologram would be especially useful in that it could be used to simulate targets for the training of military personnel in the operation of radar systems and would be a useful tool in the study of wave-front reconstructions, beam widths and fringe spacings.

In view of the foregoing, it is an object of this invention to provide an effective microwave hologram.

A further object of this invention is to provide an improved method of producing a microwave hologram which extends the capability of recording of field intensity distributions into regions of the electromagnetic spectrum in which conventional photography is insensitive.

One exemplary microwave hologram may, in accordance with the invention, comprise a support member, preferably formed from a material having a low dielectric constant upon which are fixed an array of strips of microwave energy absorbing or dissipating material. These strips, which by virtue of their function, hereinafter will be referred to as scatterers, are disposed upon a planar surface of the support member at certain positions. Each scatterer has a surface area which is a function of the relative power in the interference pattern caused by the interference of the signal beam and the reference beam at a corresponding position in that interference pattern. Essentially, the scatterers perform the same function as do the black and grays of the well-known film type holograms. It has been found preferable to place these scatterers at discrete minimum power positions and dimension each of the scatterers so as to correspond to its relative minimum power condition.

An exemplary method of producing the above hologram in accordance with the invention may include the steps of: Illuminating an object with a signal beam and simultaneously directing a reference beam to a position where it will interfere with the signal beam after the latter has been scattered by the object. A recording antenna probe is then moved about a reference plane dispersed in the interference pattern. The pattern is scanned by the probe to measure and locate discrete relative power levels. Scatterers having surface areas corresponding to the power levels at these minima positions are then placed in corresponding positions upon a sheet of material having a low dielectric constant. The scatters so located provide the microwave hologram. When this hologram is illuminated with microwave energy from the signal beam, an interference pattern is developed which corresponds to that when the object alone is illuminated by the signal beam.

The invention itself, both as to its organization and method of operation, as well as additional objects and advantages thereof will become more readily apparent from a reading of the following description taken in connection with the accompanying drawings, in which.

Generally speaking, a hologram in accordance with the present invention is arranged to provide a representation of the interference pattern of a signal beam, after it has been scattered by an object, and a reference beam, both beams operating at a predetermined microwave frequency which, preferably, is the same for both. A hologram constructed in accordance with the invention when illuminated by a microwave beam operating at the signal beam frequency will produce a scattered pattern which will correspond to that produced if the object itself were illuminated by the signal beam.

Figure 2:
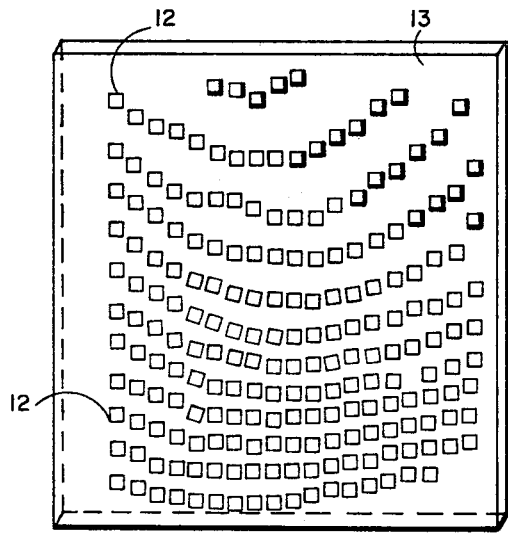
FIGURE 2 depicts one version of a microwave hologram produced by the system of FIGURE 1.
Figure 3:
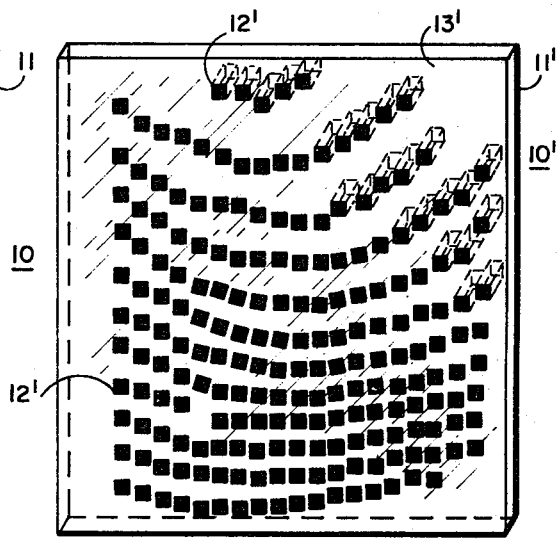
FIGURE 3 is still another version of a hologram made in accordance with the invention.

FIGURES 2 and 3 each depict different microwave holograms made in accordance with the invention. In FIGURE 2, the hologram 10 includes a thin rectangular member 11, (viz., a slab or sheet) formed of a low dielectric constant material such as plastic foam. A plurality of scatterers 12 are affixed on a planar surface 13 of the member 11. The scatterers 12 may be strips of reflective metal, such as aluminum foil, or a microwave absorbing material, for example fiberglass laminate which has been coated with a carbon paint. As noted above, the scatterers 12 are each preferably located at positions which correspond to a location of relative minimum power in the interference pattern between the aforesaid signal and reference beams. Moreover, each of the scatterers 12 is so dimensioned that when its surface area is exposed to the signal beam, it produces the minimum power level which would be caused if the signal beam alone were to illuminate the object. A method for determining the size of the scatterers will be described later in this specification.

In FIGURE 3 the illustrated hologram 10' is depicted as a transparent photographic screen which is a replica drawn to scale of the hologram of FIGURE 2. To form the hologram 10', a drawing is made which is also a replica of the hologram 10 in that it is essentially black where the scatterers 12 are placed and white where there are no scatterers. This drawing is then photographically reduced in size to produce the transparent hologram 10'. In the transparent hologram 10', the black, more opaque regions 12' represent minimum power locations, whereas the light or more transparent regions represent relatively high intensity patterns. It will be noted that to simplify the illustration only certain of the colored regions 12' have been shown as extending through the entire thickness of the screen.

Quite unexpectedly, it has been found that when the transparent hologram 10' is placed in the path of a coherent light (e.g. a laser beam), the physical configuration of the object will be reconstructed so as to be intelligible to a human observer.

Figure 1:
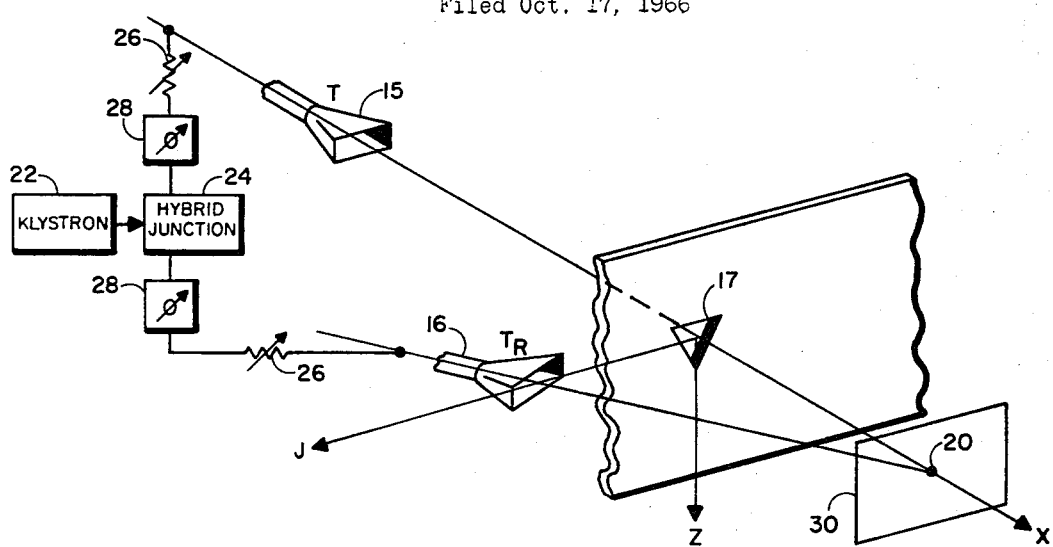
FIGURE 1 is a diagrammatic representation of a system for producing a microwave hologram in accordance with the present invention.

A system for forming the holograms of FIGURES 2 and 3 is shown in FIGURE 1 to comprise two microwave transmitting antennas 15 and 16, with the antenna 15 developing the so-called signal beam which is adapted to illuminate an object 17, whereas the antenna 16 produces the reference beam. The reference beam interferes with the signal beam after it has been scattered by the object 17 in an interference pattern region 20.

In order to produce the necessary microwave energy, the system includes a klystron 22 which is in direct communication with a hybrid junction 24. The hybrid junction 24 divides the energy from the klystron 22 into two different portions, each portion being delivered to one of the aforementioned antennas 15 and 16. Interposed between the hybrid junction 24 and each of the antennas 15 and 16 are suitable attenuating and phase shifting devices 26 and 28, respectively, which function to adjust the relative amplitude and phase of the mircowaves delivered by each of the antennas 15 and 16. The arrangement permits adjustment so that in the region 20, the interfering signal and reference beams would be in phase (in an additive relation) if the object 17 were removed from the path of the signal beam.

In order to record the radiation pattern developed by the interfering reference and signal beams, as antenna probe, for example an open-ended wave guide, is moved about and samples the intensity pattern at an imaginary plane 30, disposed in the region 20; the plane 30 being substantially perpendicular to the direction of the signal beam.

The relative intensity detected by the antenna probe is actually provided in record form by means of connecting the probe to a conventional crystal type detector which is coupled to a pattern recording device, which provides an accurate permanent record of both the location and intensity of the interfering beams. The crystal detector may, of course, be calibrated by means of a precision wave guide attenuator. The record formed by the above scanning process provides the basis for constructing a hologram in accordance with the invention.

It has been found that by placing scatterers formed of microwave reflecting material, such as aluminum foil, or microwave absorbing material, such as fiberglass laminate coated with a carbon paint, at a position corresponding to the location in the plane 30 where the record reveals that the power levels rapidly dropped off (viz. relative power minimas), an effective hologram is constructed. On the other hand, holograms in accordance with the invention may also be constructed by placing scatterers at different positions corresponding solely to the relative power measured at the position.

Each of the scatterers, of course, should be dimensioned to be representative of its corresponding relative minimum power level which is computed as follows: Firstly, the intensity at the plane 30 is measured when only the reference beam is being developed by the antenna 16. Secondly, the signal beam is turned on and the object 17 placed in the path of the signal beam and the relative minimum power conditions caused by the interfering beams is recorded. Thirdly, the difference between the relative minmium power condition and that power level when only the antenna 16 is radiating is then calculated and represents that power which a particular scatterer must dissipate in order that the hologram 10 provides the desired pattern when only the signal beam is turned on.

It has been observed, for the scatterers tested, that by dimensioning the width of a scatterer to be under one wave-length, this dimension does not appreciably affect the energy absorbing or reflecting characteristics of the scatterer. On the other hand, if the strip width is selected to be greater than four or five wave-lengths, then it will play an important role and should be considered in determining the size of any given scatterer.

In determining the size of a scatterer, a particular scatterer may be placed upon the supporting member and located at the position where the object is shown in FIGURE 1. Then the signal beam is turned on and an antenna probe measures the relative power behind the scatterer at the plane 30. By conducting a sufficient number of measurements on scatterers of different sizes, a graph may be constructed of power attenuation vs. strip height (assuming strip thickness to be small) which would provide a basis, by extrapolation, for determining the dimensions of any given scatterer which is to absorb a particular amount of microwave energy.

For a specific example, take the object 17 as being a triangular aperture cut out of a screen of microwave-absorbing material and the reference and signal beams as being linearly polarized microwaves of a frequency of 16.000 gc./s. having a wave length of 1.873 centimeters. In order to facilitate recording by the antenna probe, both the microwave fields were chopped or modulated at a low frequency about 1 kc. The relative power levels are measured at the plane 30, spaced about 65 cm. from the object 17. Data recorded from this depicted a distribution of power levels. For this particular test the scatterers were formed by fiberglass laminate coated with carbon paint. The thickness of each strip was chosen to be under one-sixteenth inch. As to the surface area, it was observed that the width of each of the minima regions measured approximately one-quarter inch. Accordingly, both width and strip thickness were chosen and fixed; the only variable was strip height which ranged from one-quarter inch to almost one inch to construct the hologram. The accuracy of power dissipative or reflective capability of a scatterer may be readily checked by operating only the antenna 15 and sensing the relative power levels behind the scatterer with the hologram placed at the position which the object occupies.

It has been found preferable in the production of microwave holograms if the reference and signal beams intersect at angles less than about 30°.

From the foregoing description it will be apparent that there has been provided an improved hologram and an improved method of forming holograms. Variations and modifications of the illustrated invention will undoubtedly become apparent to those skilled in the art. For example, although a preferred method of forming holograms has been described, a hologram may be made in accordance with the invention by constructing a pattern of the changes in power level caused solely by the signal beam illuminating an object and placing scatterers at positions corresponding to the minimas of that pattern to form the hologram. The two beam method and hologram formed therefrom are, however, presently preferred. Accordingly, the foregoing description should be taken as illustrative and not in any limiting sense.

What is claimed is:
1. A microwave hologram of an object comprising
   (a) a plurality of scatterers disposed at different positions,
   (b) said scatterers each having dimensions which are functions of the power levels of a microwave interference pattern resulting from said object at their respective positions and
   (c) microwave energy transparent means for supporting said scatterers.
2. The invention as set forth in claim 1 wherein said positions are at relative minimum power levels.
3. The invention as set forth in claim 1 wherein said scatterers are composed of microwave energy absorbing material.
4. The invention as set forth in claim 2 wherein said supporting means is a relatively thin rectangular slab formed of a dielectric material having a planar surface and wherein said scatterers are fixed to a said surface thereof.
5. The invention as set forth in claim 2 wherein said supporting means is a transparent screen, and said scatterers are dark power absorbing portions on said screen.

6. A method of forming a microwave hologram comprising the steps of:
   (a) directing a signal beam of a predetermined microwave frequency against an object adapted to scatter said signal beam,
   (b) directing a reference beam at a predetermined microwave frequency so that it interferes with said scattered signal beam,
   (c) measuring the power levels at the interference position between said beams,
   (d) disposing a plurality of scatterers in a region wherein said beams interfere, and
   (e) sizing each said scatterer so as to be representative of the power level at its respective location in said region.

7. The method as set forth in claim 6 including the step of producing a member having discretely colored positions representative of discrete power levels.

8. The invention as set forth in claim 6 wherein said discrete minimum power levels are a function of the difference between the power of said reference beam at said interference position when said signal beam is shut off and the power at said position between said interfering beams.

9. The invention as set forth in claim 8 wherein said beams intersect to form an angle of no greater than approximately 30°.

10. The method as set forth in claim 7 including the step of photographically reducing said pattern in size to provide a transparency thereof.

11. The method as set forth in claim 10 wherein each said scatterer is sized so as to be representative of a measured discrete minimum power level.

12. The method of forming a microwave hologram of an object comprising the steps of:
   (a) illuminating said object with a beam of microwave energy to derive an interference pattern therefrom,
   (b) placing a plurality of elements of material which is non-transmissive of said energy in different locations respectively corresponding to different positions in said pattern,
   (c) dimensioning said elements to correspond to the energy levels of said pattern at their said respective locations.

References Cited
UNITED STATES PATENTS 3,315,259   4/1967   Wesch _____ 343—18

OTHER REFERENCES

"Wavefront Reconstruction with Diffused Illumination and Three-Dimensional Objects." J.O.S.A., Oct. 30, 1964, pp. 1295–1301, vol. 54, No. 11. Holography Digest, Leith et al.

RODNEY D. BENNETT, *Primary Examiner.*

C. E. WANDS, *Assistant Examiner.*